UNITED STATES PATENT OFFICE.

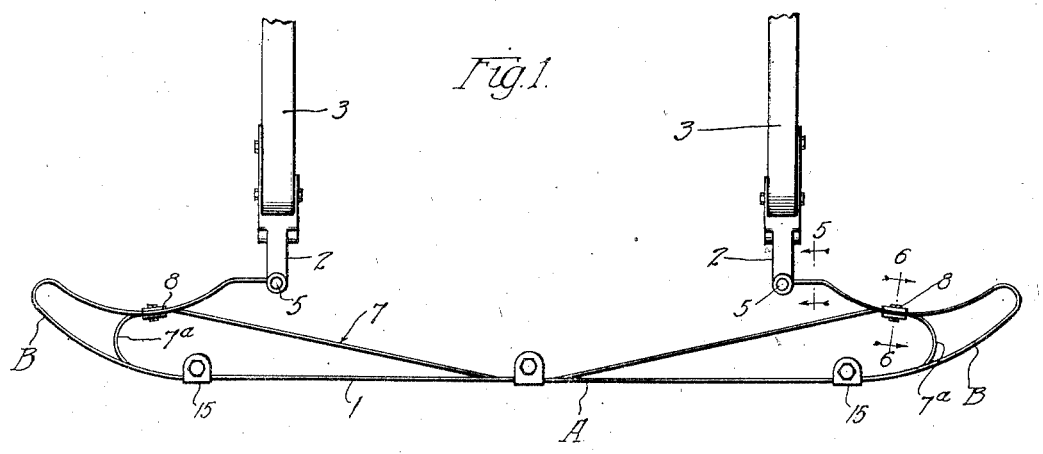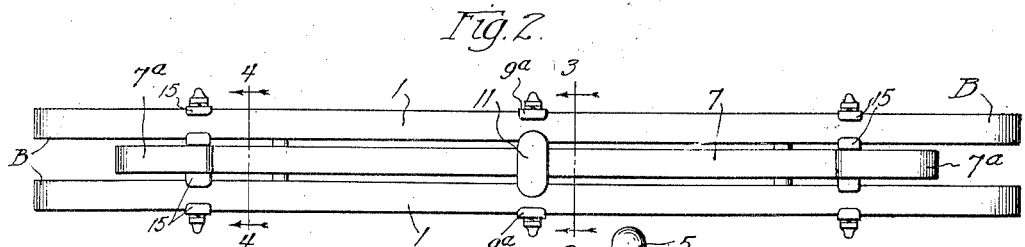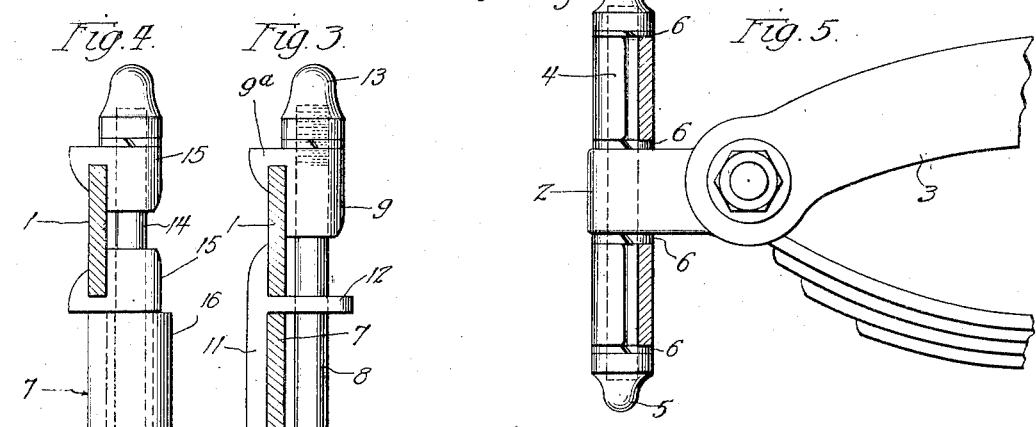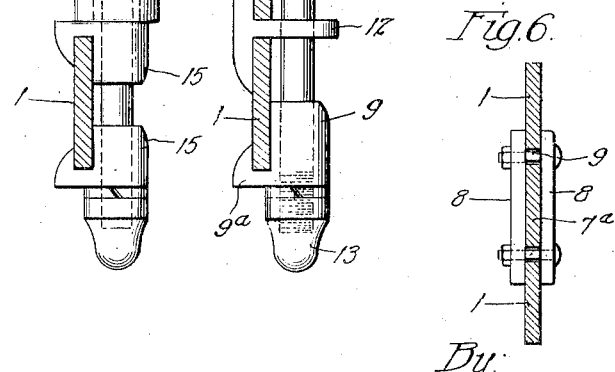

ALLAN L. McGREGOR, OF CHICAGO, ILLINOIS.

AUTOMOBILE-BUMPER.

1,372,155.  Specification of Letters Patent.  Patented Mar. 22, 1921.

Application filed January 17, 1921. Serial No. 437,735.

*To all whom it may concern:*

Be it known that I, ALLAN L. McGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to bumpers of the resilient bar type, and further characterized by the wide impact surface consisting of two or more bars spaced apart in the same vertical plane. In common with bumpers of all types, the object of the present invention is to provide a structure which will afford the greatest protection to a motor vehicle in the event of collision. The desirable features of a bumper of this character are obtained, for the most part, by assembling and arranging the resilient bars in such a manner as to absorb the maximum amount of the force of impact by the resilient qualities of the structure, at the same time having a sufficient degree of strength and rigidity to enable the parts to resume their original shape without permanent distortion.

A bumper having these general characteristics will now be described in connection with the accompanying drawings, in which:—

Figure 1 is a top plan view of a bumper as attached to a vehicle frame,

Fig. 2 is a view in front elevation of the bumper,

Fig. 3 is an enlarged detailed view taken on line 3—3 of Fig. 2, showing the connection used at the central portion of the impact section, Fig. 4 is a similar detailed view taken on line 4—4 of Fig. 2, and showing the type of connection used at the ends of the impact section, Fig. 5 is an enlarged detailed view taken on line 5—5 of Fig. 1, showing the method of attaching the bumper to the vehicle frame, and Fig. 6 is an enlarged detailed view in vertical section taken on line 6—6 of Fig. 1.

A bumper of the general class to which the present type belongs, comprises an impact member extending throughout the full length of the bumper, and made up of resilient bars 1—1 spaced apart vertically, one above the other, and having the same shape or conformation. As clearly shown in Fig. 1, each of the bars 1 has a straight central portion which may be said to constitute the central impact section A. Beyond this central section each of the bars 1 is curved slightly to the rear, and at the extreme ends of the bumper are bent sharply to the rear and inwardly, forming U-shaped end sections B—B of the bumper. The free ends of the bars 1—1 terminate beyond the end sections B—B to the rear of the impact section A, and are directly connected to the attaching brackets or arms 2—2 mounted at the ends of the frame members 3—3 of a motor vehicle. As clearly shown in Fig. 1, the portions of the bars 1—1 intermediate the extreme ends of the bumper and the arms 2—2 are concave in a forward direction, and adjacent to their free ends resume a parallel relation to the impact section A, and meet the arms 2—2 at right angles.

In Fig. 5 is disclosed the manner in which the bars 1—1 are secured to the arms 2—2 of the attaching brackets, these arms being preferably integral projections extending forwardly from a bracket clamped to the forward ends of the frame members 3—3. Extending vertically through each of the arms 2 is a pin 4 projecting equal distances above and below the arm. Surrounding the projecting portions of the pin are the free ends of the bars 1—1, there being formed eyes at said ends of the bars for this purpose. At the ends of the pins are mounted screw caps 5—5, the same being spaced from the bars by means of washers 6, some of the washers being inserted between the inner edges of the bars and the arm 2. By mounting the ends of the bars in the manner just described, a certain degree of rotative movement is permitted between the pins 4—4 and the free ends of the resilient bars 1—1, thus providing a more or less flexible connection.

It is to be observed that the bars 1—1 are spaced apart vertically a distance slightly greater than the width of each bar, and inasmuch as the bars themselves are mounted so as to be yieldable in a horizontal direction, and relatively non-yieldable in a vertical direction, an impact surface of considerable width is secured. In the absence of additional connections between the bars 1—1, a rather unstable structure would result, and for this reason an additional reinforcing bar is included in the structure. This bar 7 extends throughout the central portion of the bumper, terminating short of the extreme ends thereof, and furthermore, lies in a horizontal plane between the planes of the bars 1—1 forming the main parts of the bumper structure. Considering, for convenience, that the bar 7 originates at the central point of the impact section A, and in the vertical plane of the bars 1—1, said bar extends outwardly and rearwardly at an angle of about 30 degrees to the front impact member A to points substantially midway between the extreme ends of the bumper and the point of connection of the free ends of the bars 1—1 with the arms 2—2, and at these points the bar is anchored between the rear portions of the bars 1—1 by means of pairs of clamping plates 8—8 bearing flatwise against the faces of the several bars, and secured together by means of bolts 9—9 as clearly shown in Fig. 6. From these points of connection with the rear portions of the bars 1—1, the ends of the bar 7 are bent forwardly and inwardly in the form of U-shaped portions 7ª—7ª, the free ends of which terminate in the vertical plane of the impact section A, and at equal distances from the central point or origin of the bar 7. At the central portion of the impact member, as well as the outer ends thereof at which the bar 7 originates and terminates, connecting members are employed for clearly fixing or anchoring the three bars together; namely, the two main impact bars 1—1, and the secondary or reinforcing bar 7. At the central point of the impact member, a connecting member such as shown in Fig. 3 is used, this member comprising a pin 8 on which is loosely carried two blocks 10—10 having integral hook members 10ª—10ª which engage the extreme edges of the bars 1—1. Between the blocks 10—10, which occupy positions adjacent the ends of the pin 8, is mounted a locking plate 11 bearing against the outer faces of the bars 1—1 and 7, and provided with integral ears 12—12 which project between the adjacent edges of said bars and engage the pin 8 by means of apertures formed in said ears. At the ends of the pin 8 are mounted screw caps 13—13, either of which may be removed in order to disassemble the parts of the connecting member.

The ends of the bar 7 are connected to the bars 1—1 by means of similar connecting members such as shown in detail in Fig. 4. A pin 14 is used in the same manner as before described, there being mounted on the pin pairs of hook blocks 15—15, each pair gripping each of the bars 1—1 between them. The central portion of the pin 14 is engaged by an eye 16 formed at each extremity of the bar 7, thereby effecting a pivotal connection directly with the pin, and indirectly with the bars 1—1.

It is manifest that the presence of a reinforcing bar 7 adds considerable rigidity to the structure, as well as increasing the capacity of the structure to withstand impacts received. It is clear that a shock delivered against the impact surface is partially resisted by the resiliency of the bars 1—1 and partially by the reinforcing bar 7, the inclined portions extending rearwardly and outwardly from the central point of the impact section A serving as brace or truss members, whereas the U-shaped end portions 7ª—7ª serve as resilient spring members which reinforce the end sections B—B and resist those forces, tending to flatten the impact section A against the rear portions of the end sections B—B intermediate the extreme ends of the bumper, and the points of attachment thereof, with the vehicle frame. Moreover, the vertical anchoring of the several bars together at various points throughout the bumper structure affords the necessary rigidity against vibration, which a bumper is subjected to in the driving of the vehicle over rough roads and pavements. The connecting members used for this purpose securely tie all the parts together, thus forming a strong and yet yieldable protective structure.

Having described the features of my invention, I claim as new and useful:

1. In a bumper, the combination of a plurality of parallel bars spaced apart vertically throughout the length of the bumper, and bent rearwardly and inwardly throughout their end portions into U-shape, means for connecting the free ends of said bars to the vehicle frame members, and a reinforcing bar connected centrally of said parallel bars and extending rearwardly and forwardly between the U-shaped end portions, and attached at their free ends to said parallel bars short of the ends of the bumper.

2. In a bumper, the combination of a plurality of parallel bars spaced apart vertically throughout the length of the bumper, and bent rearwardly and inwardly throughout their end portions into U-shape, and a single bar fixed at the central portion of said parallel bar, and extending outwardly to said U-shaped end portions thereof, and terminating in end portions extending transversely of said U-shaped end portions.

3. In a bumper, the combination of a plurality of parallel bars spaced apart vertically throughout the length of the bumper, and bent rearwardly and inwardly throughout their end portions into U-shape, and a single bar fixed at the central portion of said parallel bar, and extending outwardly to said U-shaped end portions thereof, and terminating in end portions extending transversely of said U-shaped end portions short of the outer ends thereof.

4. In a bumper, the combination of a pair of resilient bars spaced apart vertically throughout the length of the bumper, and bent rearwardly and inwardly at their ends for attachment to the frame members of a vehicle, and a single resilient bar fixed centrally of the bumper between said parallel bars, and extending outwardly toward the ends thereof, terminating in forwardly bent end portions extending transversely of the bent end portions of said parallel bars.

5. In a bumper, the combination of a pair of resilient bars spaced apart vertically throughout the length of the bumper, and bent rearwardly and inwardly at their ends for attachment to the frame members of a vehicle, and a reinforcing bar fixed intermediate the ends of said parallel bars, and extending rearwardly and outwardly toward the ends thereof, the end portions of said reinforcing bar being bent forwardly short of the ends of the bumper, and connected to said parallel bars.

6. In a bumper, the combination of a pair of resilient bars spaced apart vertically throughout the length of the bumper, and bent rearwardly and inwardly at their ends for attachment to the frame members of a vehicle, and a reinforcing bar extending outwardly and rearwardly from the central point of said parallel bars, to the inwardly bent end portions thereof, and thence forwardly terminating between said parallel bars short of the ends of the bumper, and connecting members at the several points of engagement.

7. In a bumper, the combination of a pair of parallel bars spaced apart vertically throughout the length of the bumper, and bent rearwardly and inwardly at their ends for attachment to a vehicle, and a single resilient bar bent to form U-shaped end portions extending transversely of the bent end portions of said parallel bars, and short of the ends of the bumper, and oblique portions converging toward the central point of said parallel bars, and members for connecting said reinforcing bar between said parallel bars, at the several points of engagement.

8. In a bumper, the combination of a pair of parallel bars spaced apart vertically throughout the length of the bumper, and bent rearwardly and inwardly at their ends for attachment to a vehicle, and a single resilient bar originating between said parallel bars, and centrally of the bumper, and extending rearwardly and outwardly, terminating in U-shaped end portions extending transversely of the space between the bent end portions of the parallel bars, and connecting members for securing the reinforcing bar between said parallel bars at their several points of vertical alinement.

9. In a bumper, the combination of a pair of parallel bars spaced apart vertically throughout the length of the bumper, and bent rearwardly and inwardly at their ends for attachment to a vehicle, and a single resilient bar extending from the central portion of the bumper outwardly and rearwardly, and terminating in U-shaped end portions extending transversely between the bent end portions of said parallel bars, the free ends of said single bar having pivotal connection with said parallel bars, short of the ends of the bumper.

In witness whereof, I hereunto subscribe my name this 11th day of January, A. D. 1921.

ALLAN L. McGREGOR.